Oct. 2, 1928.
A. C. BUSBY
1,686,367
TIRE HOLDER
Filed Oct. 18, 1927
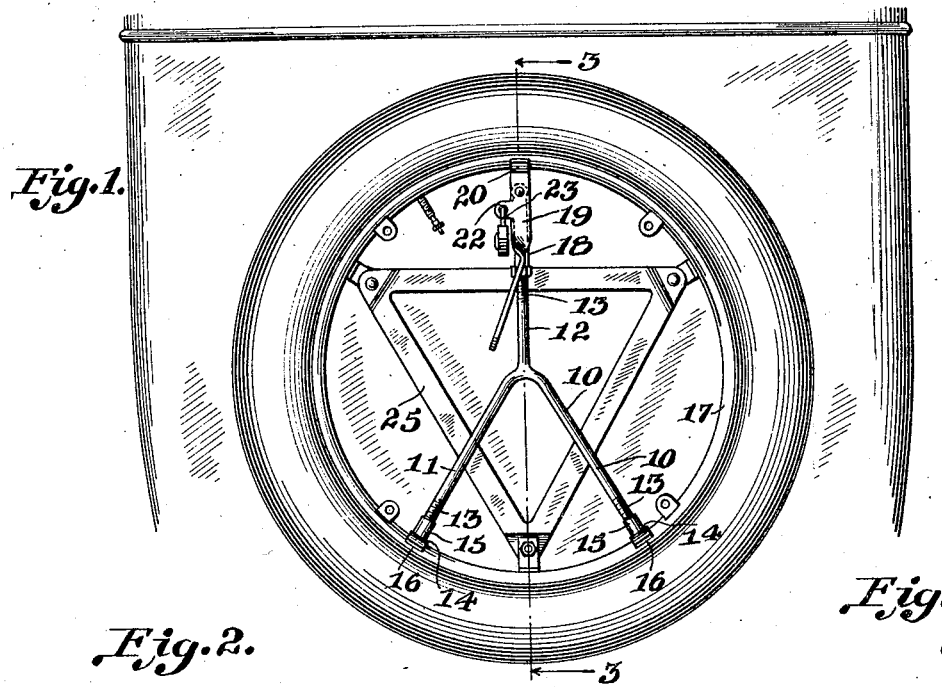
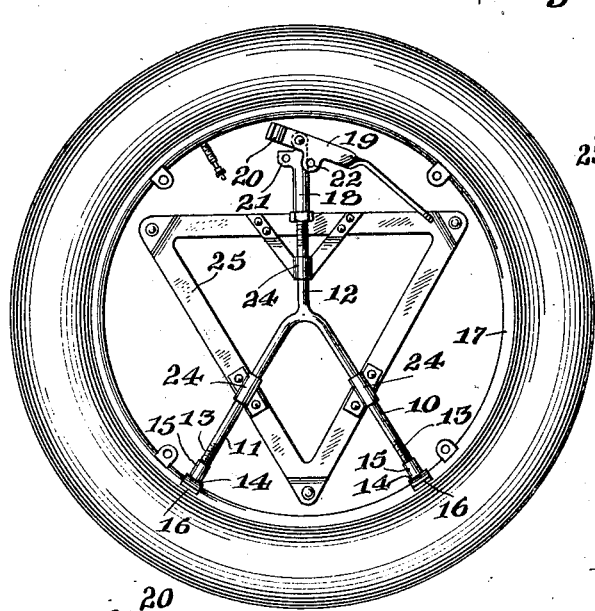
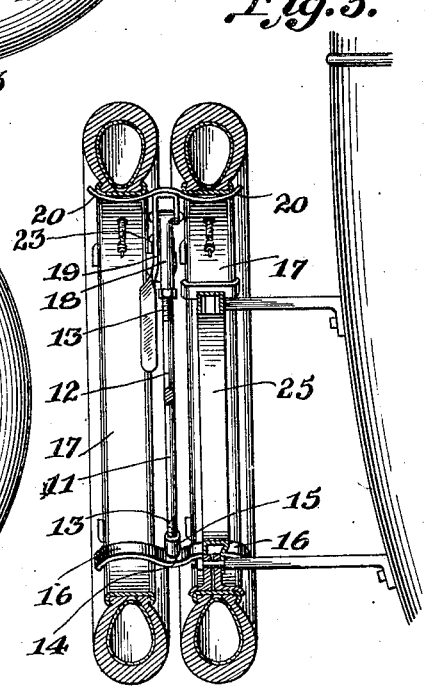
Inventor
Alvin C. Busby
By
L. R. Morrill
Attorney Patented Oct. 2, 1928.

1,686,367

UNITED STATES PATENT OFFICE.

ALVIN C. BUSBY, OF ELLENSBURG, WASHINGTON.

TIRE HOLDER.

Application filed October 18, 1927. Serial No. 227,038.

This invention relates to tire holders and has for an object to provide a new and improved type of holder for attaching one or more spare tires to a vehicle.

A further object of the invention is to provide a tire holder adapted to be applied rigidly to a vehicle or to be employed for attaching a spare tire to a spare tire already otherwise attached to a vehicle.

A further object of the invention is to provide a device of the class with improved features of convenience and reliability of functioning.

With these and other objects in view the invention comprises certain novel parts, elements, units, combinations and functions as disclosed in the drawings together with mechanical and functional equivalents thereof as will be hereinafter more fully described and claimed.

In the drawings:

Figure 1 is a view of the invention in elevation in operative position and holding a tire to and upon a tire previously and otherwise attached to a vehicle.

Figure 2 is a modification showing the holder rigidly attached to a vehicle and employed for attaching a plurality of tires.

Figure 3 is a diametrical sectional view on a normally vertical line taken on line 3—3 of Figure 1.

Figure 4 is a perspective view of the hinged member of the holder and its immediately associated parts.

Like characters of reference indicate corresponding parts throughout the several views.

The tire holder which forms the subject matter of this application is adapted to be employed either rigidly and permanently attached to a car as shown at Figure 2, or wholly disassociated from the car, as shown at Figures 1 and 3, which latter form will be first described, taking up the former or the first mentioned form later.

In either form, however, the device comprises a trident composed of three legs 10, 11 and 12, which are preferably screw threaded at their extremities and indicated at 13. Upon each of the legs 10 and 11 a yoke, indicated as an entirety at 14 is employed, comprising a hub 15 threaded to engage upon the screw threads 13 with oppositely extending curved arms 16 for fitting over and partially embracing one or more of the rims 17 of spare tires ordinarily carried upon a vehicle.

The third leg 12 is also provided with a member fitted upon the threaded part 13 comprising a sleeve 18 upon the end of which is pivoted a lever 19. The lever 19 carries a yoke similar to the yoke designated at 14 and comprising oppositely extending curved arms 20 similarly proportioned to fit and engage the inner surfaces of rims 17.

The sleeve 18 is provided with a perforated ear 21 and the lever 19 with a perforated ear 22 through the perforations of which the shackle 23 of a padlock or any other lock or securing means may be inserted to lock the lever 19 against unauthorized movement.

As shown at Figure 2, clips 24 are shown as securing the device rigidly to a vehicle. In this case the frame 25 forming a part of the usual and ordinary tire carrier is permitted to remain under the trident rigidly secured to this frame by the clips 24. It is obvious that it may be attached in any other manner found desirable or convenient, depending upon the type of apparatus already found upon the vehicle or to provide for the original installation in case no such apparatus is found, but such attaching means would vary so greatly because of different types of vehicle that no attempt is made to show more than one generic means for attaching to the vehicle.

In operation, if the device is rigidly attached to the vehicle, one or more tires upon their rims 17 will be put in position while the lever 19 is in the position shown at Figure 2. The device is adjusted to accommodate itself to various sized rims by adjustment upon the several screw threaded sections 13 of the trident and, when such adjustment has been secured, no further change will be necessary so long as it is employed in conjunction with rims of the same size. The curvature of the arms 16 and 20 permit the device to fit rims of different widths, whereas the adjustment just referred to adjusts to rims of different diameters.

When the proper adjustment is secured and the rim put in the position shown, the lever 19 is swung from the position shown at Figure 2 to the position shown at Figure 1, whereupon the rim is clamped rigidly relative to the carrier. The device is then locked against unauthorized tampering by the use of a padlock through the ears 21 and 22 or, of course, any other type of locking or fastening means may be substituted therefor.

If the device is employed for attaching one tire to a tire already otherwise attached to a vehicle, it is simply placed in position relative to the attached tire, the tire to be attached placed in position and the lever 19 swung about as heretofore described, attaching the two rims rigidly together and, therefore, attaching the second rim permanently to the first rim.

The position in which this device is shown in the drawings is not to be considered as any limitation upon the invention as it is perfectly obvious that whether used as a permanent adjunct or an accessory to the vehicle, it might be reversed or in fact used in any other position with equal efficiency and satisfaction.

What I claim to be new is:

1. A tire holder comprising a trident having arms of invariable lengths extending adjacent to the perimeter of the organization, screw threads formed at the several extremities, yoke applied to some of the screw threaded extremities, a sleeve applied to one of the screw threaded extremities, a lever fulcrumed to the sleeve, and a yoke carried by the lever.

2. A tire holder comprising a trident having arms of invariable lengths extending adjacent to the perimeter of the organization, screw threads formed at the several extremities, yokes applied to some of the screw threaded extremities, a sleeve applied to one of the screw threaded extremities, a lever fulcrumed to the sleeve to oscillate in the plane of the trident, and a yoke carried by the lever.

3. A tire holder comprising a trident having arms of invariable lengths extending adjacent to the perimeter of the organization, screw threads formed at the several extremities, yokes applied to some of the screw threaded extremities and contoured to engage a plurality of tires, a sleeve applied to one of the screw threaded extremities, a lever fulcrumed to the sleeve, and a yoke carried by the lever contoured to engage a plurality of tires.

4. A tire holder comprising a trident having arms of invariable lengths extending adjacent to the perimeter of the organization, screw threads formed at several extremities, yokes applied to some of the screw threaded extremities and contoured to engage a plurality of tires, a sleeve applied to one of the screw threaded extremities, a lever fulcrumed to the sleeve to oscillate in the plane of the trident, and a yoke carried by the lever contoured to engage a plurality of tires.

In testimony whereof I affix my signature.

ALVIN C. BUSBY.